United States Patent [19]

Nilsson

[11] Patent Number: 4,548,061

[45] Date of Patent: Oct. 22, 1985

[54] CYLINDER-LOCK ATTACHMENT MEANS

[75] Inventor: Erik A. Nilsson, Eskilstuna, Sweden

[73] Assignee: GKN-Stenman AB, Eskilstuna, Sweden

[21] Appl. No.: 395,062

[22] PCT Filed: Nov. 11, 1981

[86] PCT No.: PCT/SE81/00333

§ 371 Date: Jun. 22, 1982

§ 102(e) Date: Jun. 22, 1982

[87] PCT Pub. No.: WO82/01733

PCT Pub. Date: May 27, 1982

[30] Foreign Application Priority Data

Nov. 14, 1980 [SE] Sweden ............................... 8008019

[51] Int. Cl.[4] .......................... E05B 9/08; F16B 41/00

[52] U.S. Cl. ........................................ 70/370; 70/232; 70/371; 70/372; 70/375; 70/422; 70/451; 70/452; 70/DIG. 57

[58] Field of Search .................................. 70/450–452, 70/369–373, 375, DIG. 57, 416, 447, 422, 229, 232, DIG. 60

[56] References Cited

U.S. PATENT DOCUMENTS

| | | | |
|---|---|---|---|
| 1,253,470 | 1/1918 | Cox | 70/DIG. 57 |
| 1,453,531 | 5/1923 | Smith | 70/422 |
| 1,455,583 | 5/1923 | Geraghty | 70/DIG. 57 |
| 1,881,567 | 10/1932 | Henke, Jr. | 70/232 |
| 1,881,866 | 10/1932 | Nehls | 70/232 |
| 1,986,453 | 1/1935 | Shaw | 70/369 |
| 2,020,260 | 11/1935 | Larsson | 70/370 |
| 3,760,619 | 9/1973 | Colombo | 70/DIG. 57 X |
| 4,007,613 | 2/1977 | Gassaway | 70/DIG. 57 X |
| 4,073,172 | 2/1978 | Schlage | 70/370 X |
| 4,223,542 | 9/1980 | Basseches | 70/DIG. 57 X |

FOREIGN PATENT DOCUMENTS

| | | | |
|---|---|---|---|
| 481301 | 5/1976 | Australia | 70/451 |
| 341545 | 10/1921 | Fed. Rep. of Germany | 70/451 |
| 949392 | 9/1956 | Fed. Rep. of Germany | 70/451 |
| 2810756 | 9/1978 | Fed. Rep. of Germany | 70/33 |
| 2723887 | 12/1978 | Fed. Rep. of Germany | . |
| 91499 | 11/1921 | Switzerland | 70/451 |

*Primary Examiner*—Gary L. Smith
*Assistant Examiner*—Lloyd A. Gall
*Attorney, Agent, or Firm*—Sughrue, Mion, Zinn, Macpeak, and Seas

[57] ABSTRACT

In an attachment fitting for cylinder locks (3, 3') the heads (**4*a*) of a plurality of screws (4) are seated in a widened hole portion (5*a*) in the lock. A plugging or latching element (6) is arranged to co-act with a sealing pin (7) in a manner such that when the plug (3*a*) of the cylinder lock (3) is turned to a given position by means of a key, the sealing pin (7) moves inwardly in a peripheral hole (9) arranged in the plug, against the action of a spring (10). This enables the plugging or latching element (6) to be removed. Because of the presence of the plugging or latching element (6), however, the screw heads (4*a*) cannot be reached in order to loosen the screws by persons not having the correct key to the cylinder lock. The screws connect the cylinder lock (3) to a further cylinder lock (3'**) on the other side of the door.

11 Claims, 11 Drawing Figures

CYLINDER-LOCK ATTACHMENT MEANS

TECHNICAL FIELD

The present invention relates to a cylinder-lock attachment means, sometimes referred to as a cylinder-lock fitting, of the kind comprising an escutcheon or the like; a cylinder lock; one or more headed screws for securing the cylinder lock; and a hole for the respective screws, said hold having a widened portion in which the screw heads of the respective screws can be seated.

BACKGROUND ART

Previously known cylinder-lock attachment means of this kind are normally designed to be mounted on the inside of a door, and to this end are designed to fit into a standard-size hole made in the door for this purpose, the diameter of the hole in the case of Swedish standards being 40 mm.

The headed screws are passed through the cylinder lock and are normally screwed into a corresponding cylinder lock on the outside of the door, in which case the screws are passed through a lock housing arranged in a recess in the door and accommodating a lock mechanism, normally a latch plunger mechanism, which can be activated by the cylinder locks.

The escutcheons or cylinder fittings may also be mutually connected together by means of one or more screws, which then also pass through the lock housing.

Thus, the cylinder lock located on the outside of the door is joined to the cylinder lock on the inside of the door by means of screws whose heads are located in the "inner" lock and which cannot therefore be reached from the outside of the door. The screw-heads, however, can be reached from the inside of the door, and tightening of the screws with a screw driver causes the two cylinder locks to be urged towards each other while being accurately fixed and aligned relative to each other and to the door.

An arrangement of this kind creates problems when the door in question cannot be considered to have an inside and an outside, i.e. both sides of the door can be considered as the "outside". This is primarily the case with locales and rooms which have additional entrance possibilities. In this case it is relatively simple for a person to unlawfully activate the "inner" cylinder lock, by simply unscrewing the readily accessible screws, removing the cylinder lock and then releasing the latch plunger mechanism in the lock housing, in a suitable manner.

Normal houses and flats present a similar problem, particularly if an intruder is able to gain entrance through a readily forced balcony door, a lower floor window or the like, whereafter the cylinder lock on the "inside " of a door can readily be opened in the aforesaid manner, enabling the intruder to leave through a conventional exit, normally the main front door, together with any stolen goods. It will readily be understood that much less attention will be paid to an intruder who uses a normal exit as his retreat path, and that he or she will be more difficult to discover than if leaving the building, together with any stolen goods, via a lower floor window, balcony door or the like.

DISCLOSURE OF THE INVENTION

It will be obvious from the aforegoing that there is a need firstly to render all screws in an "inner" cylinder lock inaccessible, and secondly to reinforce the attachment-fitting arrangement, including both the inner and outer escutcheons as a whole, so as to increase their resistance against the use of force.

Those methods previously proposed for hiding or covering both the inside and outside of the screws joining the locking cylinders and escutcheons respectively in a cylinder-lock fitting arrangement of the kind meant here have not been satisfactory. Thus, only a small amount of force has been needed to render the heads of the screws accessible. Furthermore, it has been relatively simple to remove the attachment fittings with the aid of a crowbar or like forcing implement, and then to activate the locking mechanism in the lock housing in a manner to enable the door to be opened.

Accordingly, an object of the present invention is to provide an attachment-fitting arrangement in which the heads of the screws which anchor the cylinder lock or locks are practically inaccessible to unauthorized persons, but readily accessible to authorized persons possessing a key to the cylinder lock in question.

Another object of the invention is to provide an attachment-fitting arrangement which comprises escutcheons which are joined to one another by means of screws and which are accommodated in a hole of standard size on both sides of the door and which have an improved strength and resistance to force.

Still another object of the invention is to provide an attachment-fitting arrangement of the aforementioned kind which can be used on either the inside or the outside of a door, depending upon the security requirments against forced entry.

BRIEF DESCRIPTION OF THE INVENTION

An attachment-fitting arrangement according to the present invention is mainly characterized by a screw-head latching or plugging element (referred to as a "plugging element" in the claims) anchored in the cylinder lock, said latching or plugging element being removable, so that the heads of the screws will not be accessible for loosening until the plug of the cylinder lock is rotated to a predetermined position of rotation by means of a key belonging to the lock.

The latching element renders the screw heads inaccessible and/or prevents the screws from being undone, and hence it is of no matter on which side of a door the cylinder lock in question is located. An intruder who has unlawfully entered a room provided with a door having fitted to the inside thereof a cylinder lock of the kind in question will be unable to reach the heads of the screws anchoring the cylinder lock, since he is prevented from doing so by means of said latching element. On the other hand, it is a simple matter for an authorized person possessing a key to the cylinder lock to insert the key into the lock and turn said lock to a predetermined angular position, whereafter the latching element can readily be removed so as to expose the heads of the cylinder-lock anchoring screws.

According to one suitable embodiment of the invention a sealing means (referred to as a "latching means" in the claims) for anchoring the latching element in said predetermined position of the cylinder plug can be moved to a release position in which the latching element can be withdrawn through said widened part of said hole.

Such a sealing element may have comparatively small and slender dimensions and still afford purposeful and reliable anchoring of the latching element. In this respect, in practice, the sealing element preferably has the form of a pin movably arranged in a bore which extends at right angles to the axis of the widened part of said hole and which, in said predetermined position of rotation of the cylinder plug, coincides with a radially extending, peripheral hole in the cylinder plug, in which hole part of the sealing pin is able to enter against the action of a spring when a force is exerted on the sealing element for withdrawing the same. It will be understood that despite its simplicity the sealing pin constitutes a reliable element for anchoring the latching element, said anchorage being effected by passing the pin into a recess, for example into a waisted portion of the latching element. When the latching element is withdrawn, the sealing pin will be urged inwardly against the action of said spring, towards the center of the cylinder plug at the same time as the latching element is withdrawn.

To facilitate co-action between the two elements, the sealing pin suitably has a rounded end, while the recess, for example the waisted portion of the latching element, has a concave shape.

Further, the latching element suitably has at its outer end a weakened grip portion, e.g. of frusto-conical configuration, arranged to fracture if force is used there against when attempting to withdraw the latching element.

In a previously known attachment-fitting arrangement of the kind mentioned in the introduction, although lacking both the latching element and the sealing means therefor, there is provided in the cylinder fitting outside the cylinder lock one or more holes and a corresponding number of headed screws which are inserted through said holes, and by means of which the cylinder fitting can be connected to a further cylinder fitting on the other side of a door or the like on which the cylinder fitting is mounted. In the end of the cylinder fitting there is an internal screw thread arranged to cooperate with a corresponding screw thread on the periphery of an end plate arranged to cover said screw heads when said plate is screwed into the cylinder fitting, and with a hole which registered with the plug of the cylinder lock, so as to leave the key slot of the plug accessible.

One embodiment of an attachment-fitting arrangement according to the invention is of this kind and is characterized by one or more holes arranged in the end plate in registry with the widened hole portions in the cylinder lock accommodating the latching element or elements, said latching element or elements being passed through said holes in the end plate so as to lock said end plate against rotation.

Thus, the relatively simple latching element which renders the anchoring screws of the cylinder lock inaccessible obtains the further function of preventing rotation of the end plate or catch plate, which in turn also renders inaccessible the screw heads located behind the said end plate of the screws which connect the escutcheon of the attachment-fitting arrangement to a corresponding escutcheon on the other side of the door, since the catch plate or end plate cannot be removed.

According to a modified embodiment, the latching element is accommodated in a special hole in the cylinder lock and is provided with a head member which engages directly, or indirectly via a cover plate, two mutually adjacent screw heads, so as to prevent the screws from being loosened. In this instance, the actual cylinder lock is preferably of circular-cylindrical shape. For aesthetic reasons the cylinder lock may be enclosed in a cover member which covers the screw heads and the latching element, and which has a hole for receiving the plug of the cylinder lock. The hole may be surrounded by a fitting or a plate having a more decorative purpose, i.e. not needing to be permanently anchored.

BRIEF DESCRIPTION OF THE DRAWINGS

Exemplary embodiments of the invention will now be described in more detail with reference to the accompanying drawings.

DESCRIPTION OF PREFERRED EMBODIMENTS

Figure 1:
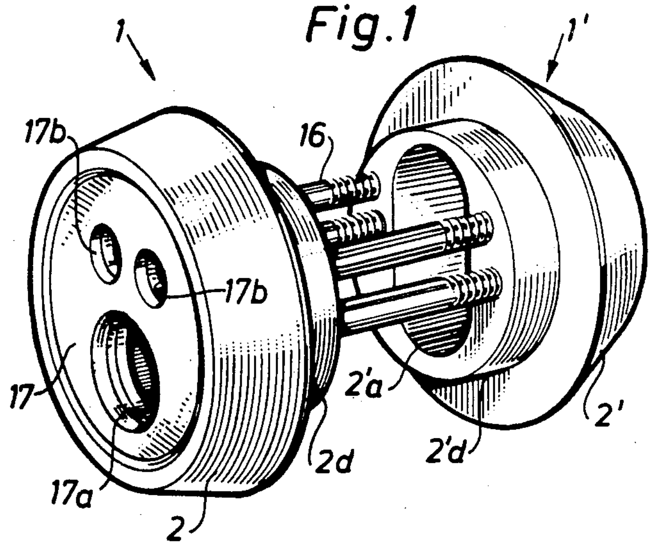
FIG. 1 is a perspective view of a first embodiment of a cylinder lock fitting connected to a similar cylinder lock fitting by means of four screws.
Figure 2:
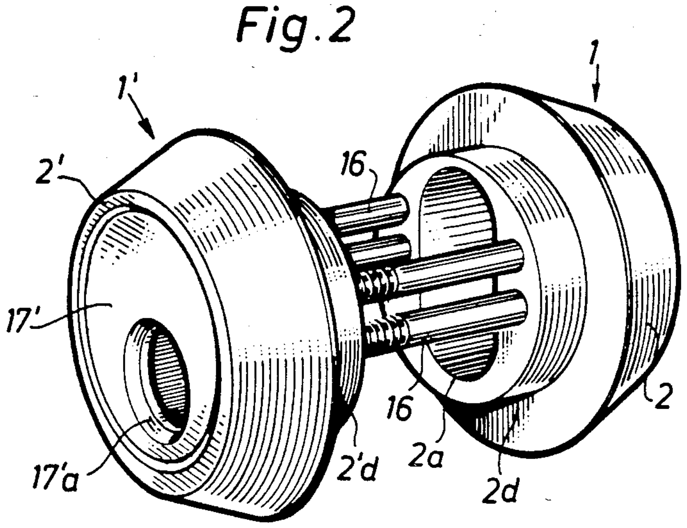
FIG. 2 is a similar perspective view showing the two lock fittings illustrated in FIG. 1 as seen from the other side.

With reference to FIGS. 1 and 2 there is shown an attachment fitting for a cylinder lock, said attachment fitting comprising a so-called cylinder lock fitting 1 having an escutcheon 2 having a male part 2*d* arranged to be housed in a 40 mm hole, and an end plate or catch plate 17 having a peripheral screw thread which co-acts with corresponding screw threads on the escutcheon 2, enabling said plate to be screwed thereinto. The end plate or catch plate 17 is provided with a circular hole 17*a*, which provides access to the key slot of a cylinder lock (not shown in FIGS. 1 and 2) arranged in the lock fitting. The catch plate also has two holes 17*b*, which are located relative to the axis of said catch plate, and the purpose and function of which will be described in more detail hereinafter.

As will be seen from FIG. 2, the escutcheon 2 and the male part 2*d* are also provided with a recess 2*a* for accommodating a cylinder lock.

The lock fitting 1 is connected by means of four robust screws 16 to an oppositely located lock fitting 1', which is of similar design to the lock fitting 1. Thus, the lock fitting 1' comprises an escutcheon 2' having a male part 2'*d*, a recess 2'*a* for a cylinder lock, and a catch plate or end plate 17' having a round hole 17'*a* corresponding to the position of the key slot for the plug of a cylinder lock.

The end plate 17' of the lock fitting 1', however, lacks eccentrically located holes corresponding to the holes 17*b* of the end plate or catch plate 17 of the lock fitting 1.

The four screws 16 connecting the escutcheons 2 and 2' of the two lock fittings together provide a considerable reinforcement in relation to conventional arrangements.

Figure 3:
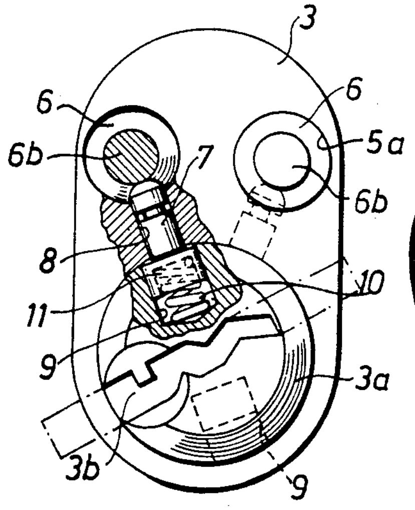
FIG. 3 is a partially cut-away end view of a cylinder lock arranged to be accommodated in a cylinder lock fitting according to FIG. 1 and provided with a latching and sealing arrangement according to the invention.
Figure 4:
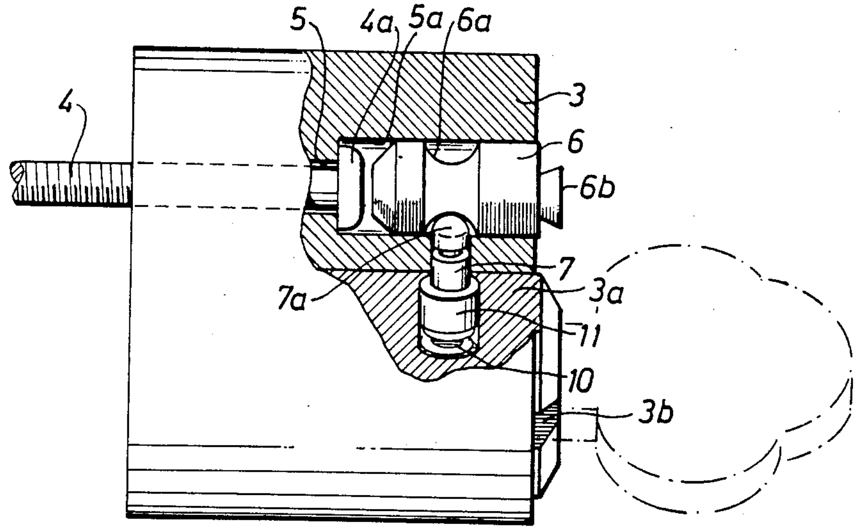
FIG. 4 is a partially cut-away side view of the cylinder lock shown in FIG. 3, together with associated latching element and sealing pin.

FIGS. 3 and 4 illustrate a cylindrical lock 3 intended to be accommodated in the escutcheon 2 of the lock fitting 1 shown to the left of FIG. 1.

The cylinder lock 3 is partially of conventional design and is provided with a rotatable plug 3*a* having a key slot 3*b*. Above the plug 3*a* are two holes 5 for anchoring screws 4 provided with heads 4*a*, said heads being accommodated in a widened forward hole-part 5*a* of the holes 5, so that said heads 4*a* seat in the widened hole parts.

The anchoring screws 4 are screwed, in a normal way, into screw-threaded holes of an oppositely situated cylinder lock 3' accommodated in the escutcheon 2' (not shown in FIGS. 1-4) of the other cylinder fitting 1'.

In order to make the screw heads 4*a* inaccessible, there is arranged in the widened hole part 5*a*, in front of the screw heads, a latching element 6 in the form of a cylindrical body having a centrally located recess in the form of a waisted portion 6*a*. The latching element 6 is arranged for rotation in the hole part 5*a* and is adapted to coact with a sealing means in the form of a pin or peg 7 movably arranged in a bore 8 and extending at right angles to the axis of the hole part 5*a*.

In the position occupied by the plug 3*a* in FIG. 3—which position can only be reached by inserting the correct key into the key recess 3*b* and turning the core to said position—the bore 8 is in registry with a hole 9 arranged peripherally with the plug, in which hole there is provided a spring 10 and a surrounding sleeve 11. Thus, the sealing pin 7 can be urged in this position inwardly towards the axis of the plug, against the action of the spring 10, permitting the latching element 6 to be withdrawn from the hole part 5*a*. Consequently, the latching element 6 can only be removed by using the correct key and rotating the plug to the position shown in FIG. 3.

As will be seen from FIG. 3, a further latching element 6 and associated sealing pin 7 is provided at the other side of the cylinder lock, and hence the plug must be rotated further in the other direction before this additional latching element can be removed.

In the embodiment illustrated in FIGS. 3 and 4, the end 7*a* of the sealing pin 7 co-acting with the waisted portion 6*a* is curved or bent, and consequently, when the plug is located in its correct position, the sealing pin will automatically be pressed in when the latching element 6 is withdrawn. In practice, the latching element 6 is withdrawn by grasping the frusto-conical peg 6*b* located on the outer end of the latching element, with a pair of pliers or the like. The frusto-conical peg 6*b* is arranged to fracture if excessive force is exerted thereonto. Thus, if an attempt is made to withdraw the latching element by grasping the peg 6*b* with a pair of pliers, without moving the plug to the position shown in FIGS. 3 and 4, the peg 6*b* will fracture, causing even greater difficulty in removing the latching element by force.

Figure 5:
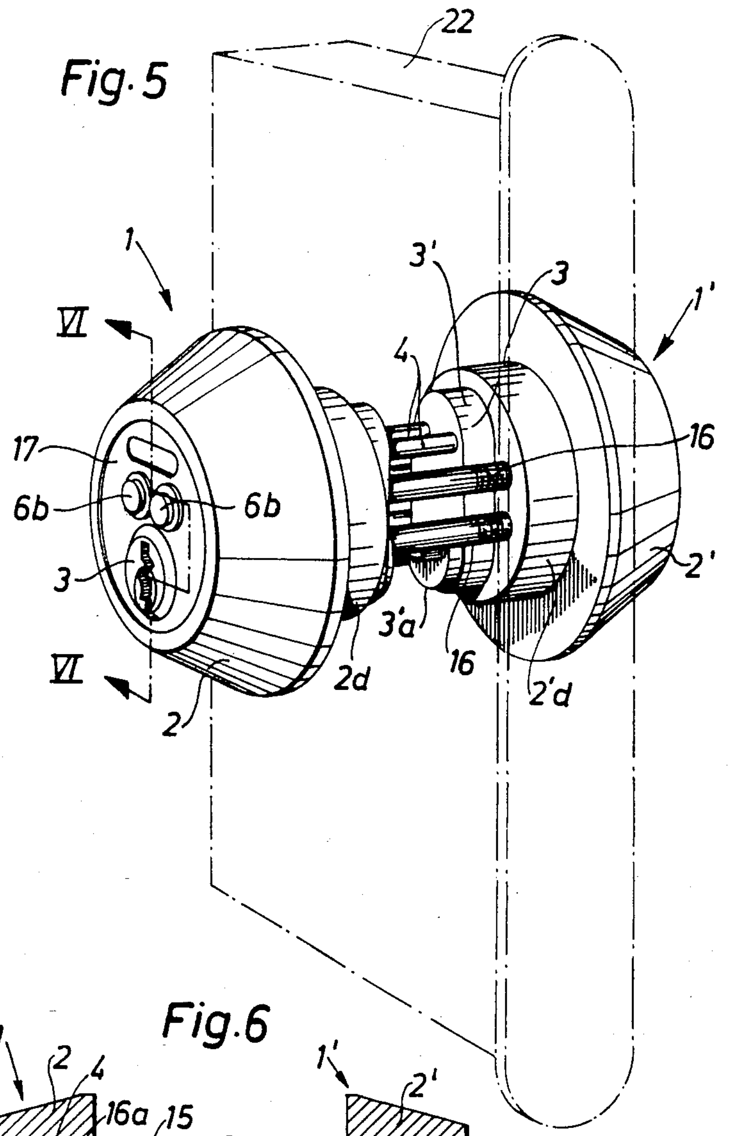
FIG. 5 is a perspective view of two mutually connected cylinder lock fittings according to FIG. 1, subsequent to mounting the associated cylinder lock and latching element.
Figure 6:
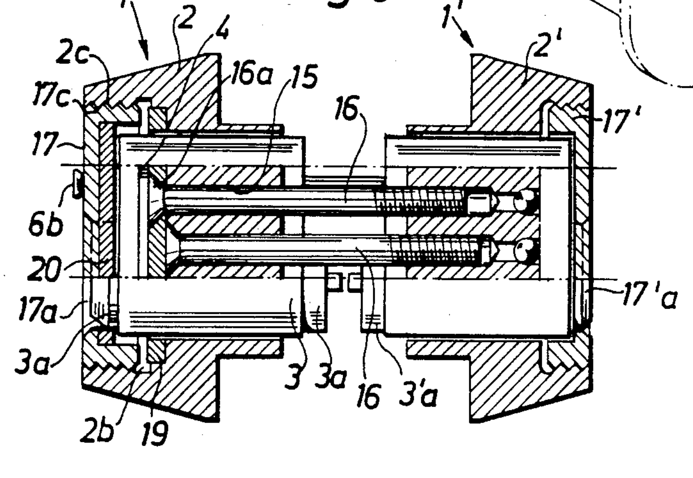
FIG. 6 is a sectional view of the cylinder lock fitting arrangement shown in FIG. 5, taken on the line VI—VI.

The construction of the two cylinder fittings 1 and 1' in connection with a lock housing 22 mounted in position on a door (not shown) is illustrated in FIGS. 5 and 6. FIG. 5 illustrates the two frusto-conical ends 6*b* of latching element 6, subsequent to mounting said elements 6 in position in the left-hand cylinder fitting 1' and sealing or fixing the position of said elements by means of said sealing elements, the plug 3*a* being subsequently rotated to the position in which the key can be removed. The two cylinder locks 3 and 3' are then thereby anchored together by means of screws 4, the heads of which (not shown in FIGS. 5 and 6) are inaccessible as a result of the sealed latching elements, the ends 6*b* of which are shown in the two figures.

The escutcheons 2, 2' of the cylinder fittings 1, 1' are shown joined together by means of four screws 16, the heads 16*a* of which are accommodated in the space 2*b* in the left-hand escutcheon 2, inwardly of the catch plate or end plate 17. In the FIG. 6 embodiment, one screw head 16*a* of two mutually adjacent screws 16 passes through a spacer plate 19, preventing the screw heads from interfering with one another.

Inwardly of the catch plate 17, which has peripheral screw-threads 17*c* and is screwed into an internal screw-thread 2*c* in the escutcheon 2, there is arranged a perforated support plate 20 for receiving the latching elements 6 and the plug 3*a* of the cylinder lock 3. Support plate 20 of varying thicknesses can be arranged in position depending on the type of cylinder lock used. The right-hand escutcheon 2' is also provided with a screw-in end plate 17', which lacks recesses for latching elements, however, (see FIG. 2).

Subsequent to placing the cylinder fittings in position, the screws 4 and 16 are tightened, whereafter the support plate 20 is inserted into the recess 2*b* and the end plate 17 is screwed in until it is contigous with the support plate 20. It should be seen at the same t ime that the two recesses 17*b* (see FIG. 1) accommodating the latching elements 6 are in registry with a respective widened hole-part 5*a* in the cylinder lock 3 (see FIG. 4).

The correct key is then inserted into the cylinder lock, and the plug 3*a* of the lock rotated until the bore 8 (FIG. 3) and the peripherial hole 10 are in registry with one another. The latching element 6 is then pressed in, which is made possible by inward movement of the sealing pin 7 in the hole 9, against the action of the spring 10.

The cylinder plug is then rotated in the other direction, whereafter the operation is repeated with the other latching element 6. When the plug of the cylinder lock is then rotated, so that the key recess takes a vertical position and the key is removed, the screw heads of the cylinder lock are latched and sealed so as to be inaccessible. At the same time, the outwardly projecting ends 6*b* of the sealing pins 6 prevent rotation of the catch plate or end plate, which prevents said plate from being removed from the escutcheon 2. Consequently, the heads 16a of the four screws 16 joining the escutcheons 2 and 2' are also inaccessible.

Figure 7:
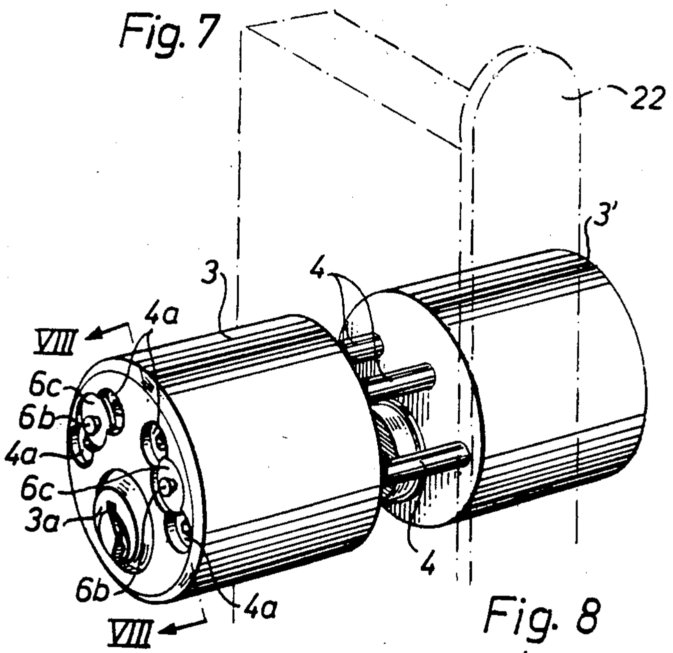
FIG. 7 is a perspective view of a modified attachment-fitting arrangement, in which the two cylinder locks are of circular-cylindrical configuration, and the latching element is arranged in a separate hole between two screw holes.
Figure 8:
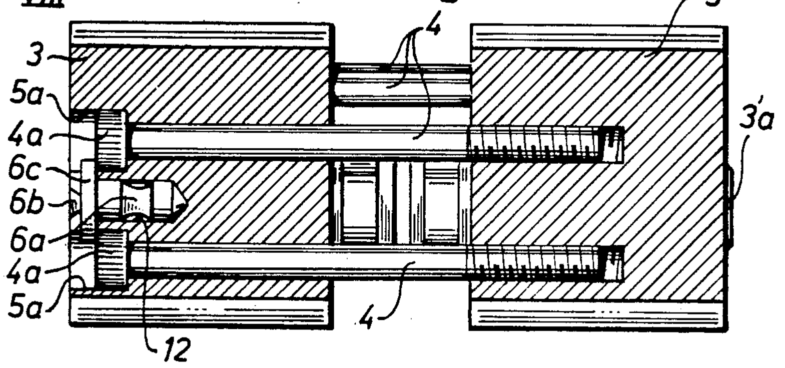
FIG. 8 is sectional view taken on the line VIII—VIII in FIG. 7.
Figure 9:
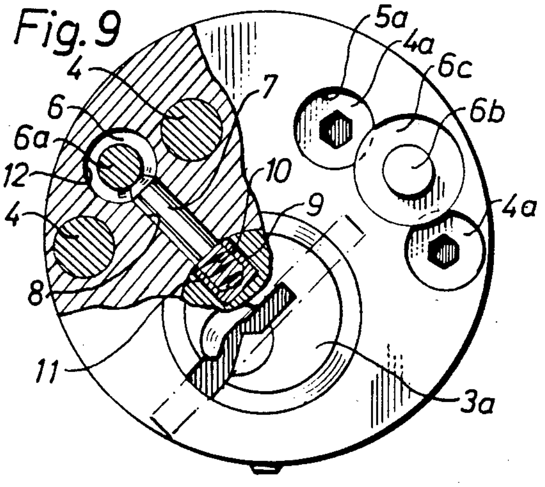
FIG. 9 is a partially cut-away front view of the cylinder lock arrangement illustrated in FIG. 7.

FIGS. 7-9 illustrate a modified embodiment in which two circular-cylindrical cylinder locks 3, 3' arranged on both sides of a door (not shown) are joined together by means of four screws 4.

In this embodiment, the latching element 6 is not accommodated in the same widened hole part 5a as the screw heads 4a. Instead, there is provided between two such widened hole parts 5a a separate hole 12 for receiving the latching element 6, which, in the illustrated embodiment, in addition to having a waisted portion 6a for coaction with a sealing pin 7, also has a forward head 6c which carries a frusto-conical peg 6b.

In this embodiment, the element 6 can suitably be called a catch, since the head 6c is intended to engage two mutually adjacent screw heads 4a in a manner to prevent the screws 4 from being removed even though the heads can be reached with a spanner or some other tool, provided that element 6 is in position.

Figure 10:
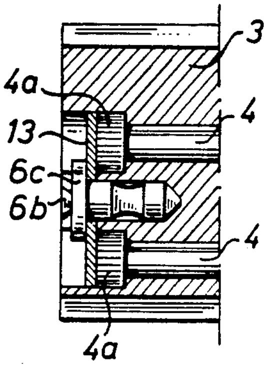
FIG. 10 is a sectional view corresponding to part of FIG. 8, of a further embodiment in which a latching element engages two mutually adjacent screw heads via a separate cover plate.

In the embodiment illustrated in FIG. 10, the head 6c of the latching element or catch 6 engages the heads 4a of two mutually adjacent screws via a separate plate 13, which prevents the heads from being reached with a screwdriver or like tool.

It will be seen from FIG. 9 that the latching element 6 coacts with a sealing pin 7 in a manner similar to the previously described embodiments.

Figure 11:
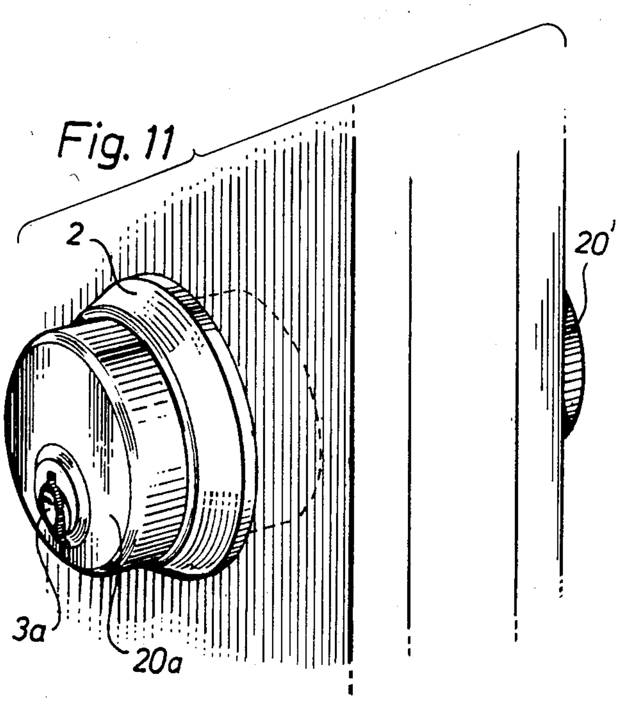
FIG. 11 is a perspective view of a cylinder-lock arrangement shown in FIG. 7 or FIG. 10 mounted onto a door, in which the cylinder lock is surrounded by a cover and an external plate attached to the door.

In the embodiment illustrated in FIG. 11, the cylinder lock, when mounted onto a door, is embraced by a cover 20a having a mainly decorative purpose, i.e. is not intended to increase the reliability of the arrangement against forced entry. The cover, however, covers the screw heads 4a and the latching or plugging elements 6, and is provided with a hole for receiving the cylinder plug 3a.

The cylinder lock and cover may also be surrounded by an escutcheon 2, which is mounted on the door and, unlike the escutcheons 2 referred to in connection with the embodiment first-described, need not necessarily be connected to a corresponding escutcheon, but may be fastened to the door in a conventional manner. The screws 4 connecting the two cylinder locks located on respective sides of the door, together with the plugging or latching element hide the screw heads and prevent them from being turned to unscrew the screws, and are sufficient to render the entire lock arrangement safe against forced entry.

INDUSTRIAL APPLICABILITY

As will be readily understood by those skilled in this art, the basic concept of the invention of anchoring a plugging or latching element by means of a sealing pin radially movable relative to the plug of the cylinder lock, so that the plugging or latching element can only be removed by persons possessing a key which fits the cylinder lock, can also be used in other connections, where it is desired to strengthen the attachment of a cylinder lock in a manner which makes forced entry more difficult. It has been shown above that the actual cylinder lock may have different forms and designs, and that the form of the escutcheon or lock fitting can also vary. Thus, the robust fitting 1 with the integrated escutcheon 2 of the embodiment first-described has been replaced in the embodiment according to FIGS. 7-11 with a thin cover 20a and separate escutcheon 2. It is also possible instead to form part of the actual cylinder lock 3 as a lock fitting or escutcheon. Further, it is not necessary to connect together two cylinder locks located on a respective side of a door. When only one cylinder lock is used, the cylinder lock can be made inaccessible by fitting and anchoring the same while applying the basic idea of the invention.

I claim:

1. A cylinder lock attachment-fitting comprising:
(a) an escutcheon (2);
(b) a cylinder lock (3) including a cylinder plug (3a);
(c) one or more headed screws (4) for securing the cylinder lock;
(d) one or more holes (5) for respective screws, said holes having a widened portion (5a ) in which the head (4a) of the respective screw seats,
(e) a screw-head (4a), a plugging element (6) anchored in the cylinder lock (3), said plugging element being so arranged that it can only be removed to provide access to said screw heads (4a) for loosening said screws (4) when the plug (3a) of the cylinder lock has been rotated to a given position of rotation by means of a key belonging to the lock, said plugging element (6) comprising a means at least partly covering one or more screw heads, and a recess in the form of a peripherally extending waisted portion (6a) of concave profile, and
(f) a latching means (7) retractable into a radial hole (9) in the cylinder plug and having an end (7a) for coaction with said waisted portion (6a).

2. A cylinder lock attachment-fitting comprising:
(a) an escutcheon (2),
(b) a cylinder lock (3),
(c) one or more headed screws (4) for securing the cylinder lock,
(d) holes (5) for respective screws, said holes having a widened portion (5a) in which the head (4a) of the respective screw seats, and
(e) a screw-head (4a) plugging element (6) anchored in the cylinder lock (3), said plugging element being so arranged that it can only be removed to provide access to said screw heads (4a) for loosening said screws (4) when the plug (3a) of the cylinder lock has been rotated to a given position of rotation by means of a key belonging to the lock,
(f) a latching means (7) for latching the anchorage of the plugging element (6), wherein, when said latching means (7) occupies a release position in the cylinder plug (3a), said plugging element can be withdrawn from said widened hole portion (5a),
(g) a radial hole (9) which is located in the cylinder plug (3a) and which extends radially to the periphery of the plug,
(h) a bore (8) located between the hole portion (5a) which accommodates the plugging element (6), and the cylinder plug (3a), and extends at right angles to the axis of said widened hole portion (5a), the axis of said bore in said given position of said cylinder plug coinciding with the axis of the radial hole (9) located in said plug, and said bore (8) receiving said latching means (7), and
(i) a spring means biasing latching means (7), whereat in said given angular position of the cylinder plug (3a), the latching means (7) is movable inwardly to its release position, against the action of said spring means (10), in which position the plugging element (6) can be withdrawn.

3. A cylinder lock attachment-fitting according to claim 2, characterized in that the latching means has the form of a pin (7) with a rounded end (7a) arranged to co-act with a concave recess (6*a*) in the plugging element (6).

4. A cylinder lock attachment-fitting comprising:

(a) an escutcheon (2);

(b) a cylinder lock (3);

(c) one or more headed screws (4) for securing the cylinder lock;

(d) one or more holes (5) for respective screws, said holes having a widened portion (5*a*) in which the head (4*a*) of the respective screw seats, and (e) a screw-head (4*a*) plugging element (6) anchored in the cylinder lock (3), said plugging element being so arranged that it can only be removed to provide access to said screw heads (4*a*) for loosening said screws (4) when the plug (3*a*) of the cylinder lock has been rotated to a given position of rotation by means of a key belonging to the lock, a latching means (7) retractable into a radial hole (9) in the cylinder plug and having an end (7*a*) for coaction with a waisted portion (6*a*) of the plugging element (6), said plugging element (6) including an outer end provided with a weakened grip portion (6*b*) of frustoconical shape, arranged to fracture when force is exerted thereagainst for the purpose of withdrawing the plugging element (6).

5. A cylinder lock attachment-fitting according to any one of claims 2, 3, 1 or 4, characterized in that the cylinder lock is of circular-cylindrical configuration and is surrounded by a removable cover (20*a*) which covers screw heads (4*a*) and plugging elements (6) and which exhibits a hole for accommodating the plug (3*a*) of the cylinder lock.

6. A cylinder lock attachment-fitting according to any one of claims 2, 3, 1 or 4, characterized in that the plugging element (6) is accommodated in a separate hole (12) located to the side of the widened hole portion (5*a*), and exhibits a head member (6*c*) which directly, or indirectly via a separate cover plate (13), prevents one or more mutually adjacent screws (4) from being unscrewed.

7. A cylinder lock attachment-fitting according to claim 6, characterized in that the cylinder lock is of circular-cylindrical configuration and is surrounded by a removable cover (20*a*) which covers screw heads (4*a*) and plugging elements (6) and which exhibits a hole for accommodating the plug (3*a*) of the cylinder lock.

8. A cylinder lock attachment-fitting according to any one of claims 2, 3, 1 or 4, including a cylinder fitting (1) having an escutcheon (2) and (j) one or more holes (15) located externally of the cylinder lock, (k) a corresponding number of screws (16) provided with heads (16*a*) and inserted in said holes (15), said screws (16) being intended for connecting a further cylinder fitting (1') on the other side of a door or the like on which the cylinder fitting (1) is mounted, (l) an internal screw thread (2*c*) arranged in the end of the escutcheon (2) and being intended to receive (m) a catch plate or end plate (17) which is intended to cover the screw heads (16*a*) and which has a peripheral screw thread (17*c*) for screwing into the escutcheon (2), and with a hole (17*a*) in registry with the plug (3*a*) of the cylinder lock (3) so that the key opening (3*b*) of said plug is accessible, characterized by (n) one or more holes (17*b*) arranged in the catch plate or end plate (17) in registry with the widened hole portion (5*a*) in the cylinder lock (3) accommodating the plugging or latching element (6), which element (6) is passed through said hole (17*b*) in the catch plate or end plate (17) to anchor said plate against rotation.

9. A cylinder lock attachment-fitting according to claim 8, characterized in that the cylinder lock is of circular-cylindrical configuration and is surrounded by a removable cover (20*a*) which covers screw heads (4*a*) and plugging elements (6) and which exhibits a hole for accommodating the plug (3*a*) of the cylinder lock.

10. A cylinder lock attachment-fitting according to claim 8, characterized in that said hole (17*b*) is eccentrical relative to the axis of the catch plate or end plate (17).

11. A cylinder lock attachment-fitting according to claim 10, characterized in that the cylinder lock is of circular-cylindrical configuration and is surrounded by a removable cover (20*a*) which covers screw heads (4*a*) and plugging elements (6) and which exhibits a hole for accommodating the plug (3*a*) of the cylinder lock.

* * * * *